US006448339B1

(12) United States Patent
Tomita

(10) Patent No.: US 6,448,339 B1
(45) Date of Patent: *Sep. 10, 2002

(54) ADHESIVE COMPOSITION

(75) Inventor: Koji Tomita, Sayama (JP)

(73) Assignees: Soken Chemical & Engineering Co., Ltd., Tokyo (JP); Lintec Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/988,905

(22) Filed: Dec. 11, 1997

(30) Foreign Application Priority Data

May 13, 1997 (JP) .............................. 9-137488

(51) Int. Cl.[7] .................. C08L 33/04; C08L 33/06; C08L 39/00

(52) U.S. Cl. .................. 525/217; 525/221; 525/227

(58) Field of Search ................. 428/412, 515, 428/520, 522, 476.3, 476.9; 525/217, 221, 227

(56) References Cited

U.S. PATENT DOCUMENTS

| | | | | |
|---|---|---|---|---|
| 4,077,932 A | * | 3/1978 | Columbus ................ 524/114 |
| 4,107,235 A | | 8/1978 | DeWitt, III ............... 525/212 |
| 4,112,215 A | | 9/1978 | Boessler et al. .......... 528/503 |
| 4,118,442 A | | 10/1978 | Douek et al. ............. 525/127 |
| 4,141,806 A | | 2/1979 | Keggenhoff et al. ....... 522/33 |
| 4,152,189 A | | 5/1979 | Guerin et al. ............ 156/331.6 |
| 4,181,752 A | | 1/1980 | Martens et al. ........... 427/516 |
| 4,230,753 A | | 10/1980 | Sheyon .................. 428/40.6 |
| 4,343,856 A | | 8/1982 | Goswami et al. ......... 428/332 |
| 4,357,435 A | | 11/1982 | Lewis et al. ............. 524/239 |
| 4,378,392 A | | 3/1983 | Segel ..................... 428/40.7 |
| 4,378,393 A | | 3/1983 | Smuckler ................ 428/99 |
| 4,404,327 A | | 9/1983 | Crugnola et al. ......... 525/228 |
| 4,414,275 A | | 11/1983 | Woods .................. 428/352 |
| 4,447,485 A | | 5/1984 | Aritake ................... 428/144 |
| 4,451,533 A | | 5/1984 | Wong et al. ............. 428/337 |
| 4,469,727 A | | 9/1984 | Loew .................... 428/31 |
| 4,496,628 A | | 1/1985 | Deatcher et al. ......... 428/337 |
| 4,499,130 A | | 2/1985 | Questel et al. ........... 428/40.6 |
| 4,500,683 A | | 2/1985 | Hori et al. .............. 524/533 |
| 4,513,039 A | | 4/1985 | Esmay ................... 428/41.5 |
| 4,522,870 A | | 6/1985 | Esmay ................... 442/67 |
| 4,568,602 A | | 2/1986 | Stow ..................... 428/172 |
| 4,569,877 A | | 2/1986 | Tollefson et al. ......... 428/141 |
| 4,574,098 A | | 3/1986 | Sampson ................ 428/41.5 |
| 4,578,309 A | | 3/1986 | Worth ................... 428/315.5 |
| 4,584,238 A | | 4/1986 | Gen et al. ............... 428/349 |
| 4,587,152 A | | 5/1986 | Gleichenhagen et al. ... 428/195 |
| 4,588,627 A | | 5/1986 | Isaksen et al. ........... 428/80 |
| 4,604,411 A | | 8/1986 | Yada et al. .............. 522/14 |
| 4,619,979 A | | 10/1986 | Kotnour et al. .......... 526/88 |
| 4,649,077 A | | 3/1987 | Lauchenauer ........... 428/317.1 |
| 4,656,077 A | | 4/1987 | Larimore et al. ......... 428/156 |
| 4,673,611 A | | 6/1987 | Crass et al. ............. 428/215 |
| 4,693,920 A | | 9/1987 | Agarwal et al. .......... 428/40.4 |
| 4,695,503 A | | 9/1987 | Liu et al. ................ 428/207 |
| 4,705,720 A | | 11/1987 | Kundinger et al. ....... 428/332 |
| 4,767,653 A | | 8/1988 | Renstrom ............... 428/41.3 |
| 4,774,291 A | | 9/1988 | Maeda .................. 525/197 |
| 4,880,683 A | | 11/1989 | Stow .................... 428/200 |
| 4,907,696 A | | 3/1990 | Decoster, Jr. ........... 206/411 |
| 4,912,169 A | | 3/1990 | Whitmire et al. ........ 525/221 |
| 4,917,926 A | | 4/1990 | Weinhold et al. ........ 428/41.5 |
| 4,925,908 A | | 5/1990 | Bernard et al. .......... 526/320 |
| 4,973,517 A | | 11/1990 | Lammers et al. ........ 428/354 |
| 5,011,867 A | | 4/1991 | Mallya et al. ........... 522/109 |
| 5,017,430 A | | 5/1991 | Chu et al. .............. 428/353 |
| 5,063,106 A | | 11/1991 | Nieuwenhuize et al. ... 428/343 |
| 5,064,923 A | | 11/1991 | Kashihara et al. ........ 526/265 |

(List continued on next page.)

FOREIGN PATENT DOCUMENTS

| | | |
|---|---|---|
| JP | 2-49087 A | 2/1990 |
| JP | 2-194081 A | 7/1990 |
| JP | 2-305878 A | 12/1990 |
| JP | 4-31480 | 2/1992 |
| JP | 8-122524 | 5/1996 |
| JP | 08-209078 A | 8/1996 |
| JP | 09-080230 A | 3/1997 |

OTHER PUBLICATIONS

Application No. 64–14919, Jan. 24, 1998.

Patent Abstracts of Japan, vol. 097, No. 007, Jul. 31, 1997, JP 09 080230, Mar. 28, 1997.

Patent Abstracts of Japan, vol. 096, No. 012, Dec. 26, 1996, JP 08 209078, Aug. 13, 1996.

Patent Abstracts of Japan, vol. 015, No. 092 (C–0811), Mar. 6, 1991, JP 02 305878, Dec. 19, 1990.

Patent Abstracts of Japan, vol. 014, No. 470 (C–0769,), Oct. 15, 1990, JP 02 194081, Jul. 31, 1990.

Patent Abstracts of Japan, vol. 014, No. 215 (C–0716), May 8, 1990, JP 02 049087, Feb. 19, 1990.

Nomura Akira et al., "Pressure Sensitive Adhesive Composition for Polarizing Plate and Polarizing Plate", Patent Abstracts of Japan, Publication Number 10–279907, Oct. 20, 1998.

Primary Examiner—Paul Thibodeau
Assistant Examiner—Ramsey Zacharia
(74) Attorney, Agent, or Firm—Oblon, Spivak, McClelland, Maier & Neustadt, P.C.

(57) ABSTRACT

An adhesive composition is prepared from a major proportion of (1) a corboxyl group-containing adhesive component having a weight average molecular weight of 800,000 or greater and a smaller amount of (2) an amino group-containing adhesion-improving component having a weight average molecular weight of 100,000 or less which is added to crosslink the component (1).

4 Claims, No Drawings

U.S. PATENT DOCUMENTS

| | | | |
|---|---|---|---|
| 5,094,912 A | 3/1992 | Deibig et al. ......... 428/355 AC |
| 5,100,963 A | 3/1992 | Lin ............................ 525/221 |
| 5,109,083 A | 4/1992 | Hsieh et al. ................... 526/93 |
| 5,110,655 A | 5/1992 | Engler et al. ............... 428/143 |
| 5,118,744 A | 6/1992 | Azegami et al. ............ 524/300 |
| 5,141,789 A | 8/1992 | Matsuzawa et al. ....... 428/41.2 |
| 5,141,989 A | 8/1992 | Jung et al. .................. 524/561 |
| 5,171,781 A | 12/1992 | Farrar et al. ................ 524/547 |
| 5,194,486 A | 3/1993 | Levine et al. ............... 524/556 |
| 5,212,011 A | 5/1993 | Ishikawa et al. ............ 428/343 |
| 5,221,584 A * | 6/1993 | Nickle et al. ............... 428/515 |
| 5,237,004 A | 8/1993 | Wu et al. ..................... 525/85 |
| 5,258,479 A | 11/1993 | Knudsen et al. ......... 526/317.1 |
| 5,264,264 A | 11/1993 | Shibata et al. ............. 428/41.8 |
| 5,266,402 A | 11/1993 | Delgado et al. ...... 428/355 AK |
| 5,281,474 A | 1/1994 | Matsuzaki et al. .......... 428/349 |
| 5,300,360 A | 4/1994 | Kocsis et al. ............. 428/304.4 |
| 5,324,781 A | 6/1994 | Date et al. .................... 525/80 |
| 5,326,842 A | 7/1994 | Knudsen et al. ......... 526/317.1 |
| 5,340,649 A | 8/1994 | Roeker et al. .............. 428/344 |
| 5,374,698 A | 12/1994 | Young et al. ................ 526/264 |
| 5,387,466 A | 2/1995 | Therriault et al. .... 428/355 CN |
| 5,441,785 A | 8/1995 | Liebe, Jr. .................... 428/40.6 |
| 5,458,983 A | 10/1995 | Wang et al. ................. 428/522 |
| 5,468,585 A | 11/1995 | Matsumoto et al. ........ 430/110 |
| 5,500,283 A | 3/1996 | Kirk et al. ................... 428/349 |
| 5,501,897 A | 3/1996 | Ichikawa et al. ............ 428/261 |
| 5,508,366 A | 4/1996 | Andrist et al. .............. 526/320 |
| 5,508,367 A | 4/1996 | Zajaczkowski ............. 526/320 |
| 5,512,612 A | 4/1996 | Brown et al. ............... 523/218 |
| 5,529,834 A | 6/1996 | Tsai et al. .................... 428/215 |
| 5,536,786 A | 7/1996 | Callahan, Jr. et al. ...... 525/221 |
| 5,540,989 A | 7/1996 | Maul et al. .................. 428/349 |
| 5,567,773 A | 10/1996 | McGee et al. .............. 525/221 |
| 5,593,759 A | 1/1997 | Vargas et al. ............... 428/200 |
| 5,622,813 A | 4/1997 | Kanda et al. ............. 430/281.1 |
| 5,641,567 A | 6/1997 | Brown et al. ............... 428/327 |
| 5,650,215 A | 7/1997 | Mazurek et al. ............ 428/156 |
| 5,660,922 A | 8/1997 | Herridge et al. ............ 428/214 |
| RE35,894 E * | 9/1998 | Ellison et al. ................. 428/46 |

\* cited by examiner

ADHESIVE COMPOSITION

BACKGROUND OF THE INVENTION

1. Field of the Invention

This invention relates to an adhesive composition, and more specifically, to an adhesive composition which, when used in adhesive films such as adhesive tapes or adhesive sheets for application on plastics, because of interaction between the carboxyl group and the amino group contained in its components, is able to impart excellent adhesion and anti-blistering characteristics to plastics under normal as well as high temperatures, and which moreover possesses excellent compatibility and transparency in itself; and also to plastic adhesive films utilizing such an adhesive composition.

2. Description of the Background Art

It has been common practice in recent years to apply an adhesive film such as an adhesive tape or sheet on the surface of transparent plastics such as polycarbonate (PC) or polymethyl methacrylate (PMMA) for the purpose of protecting such plastics. The adhesive used in such a film being applied on transparent plastics, is required to possess weathering resistance, transparency, ease in controlling adhesive power, and the like. Also, since foaming or blistering are seriously detrimental to the appearance of an adhesive film, the capability of preventing these phenomena, i.e. anti-blistering performance, is required as well.

It has been conventionally known that graft polymers, prepared by copolymerization of a major proportion of a (meth)acrylic ester and a macro monomer having copolymerizable functional groups, can be used for adhesives that can satisfy the said requirements to improve the anti-blistering characteristics for plastics.

Alternatively, an adhesive prepared by blending a main polymer containing a functional group and a low molecular weight polymer containing a different functional group that can be crosslinked with the former, and by subsequently crosslinking both polymers with a crosslinking agent is known to possess better transparency as well as excellent adhesive characteristics.

However, the above products have several shortcomings that require solutions. Namely, in the case of the adhesive mentioned earlier, impurities that have vinyl groups at both ends tend to remain in the macro monomer, making the product prone to gelation. There is also a limit in dosage from the copolymerizability as well as transparency (compatibility) considerations.

While the latter type adhesive has no significant technical problems as an adhesive, its anti-blistering performance has remained less than perfect.

Therefore, there has been a desire for the development of a technology which can economically manufactures an adhesive that possesses qualities such as weathering resistance, transparency, ease in controlling adhesive power, and anti-blistering characteristics.

The present inventor, after arduous research efforts made in an attempt to develop an adhesive that can be used for transparent adhesive films without presenting any problems, has discovered that, by combining a main polymer containing a carboxyl group and a low molecular weight polymer containing an amino group, the anti-blistering characteristics can be improved through interaction between the carboxyl group and the amino group. The present inventor has also discovered that such products will create no adverse effect in qualities such as weathering resistance, transparency, ease in controlling adhesive power, and the like. These findings have led to the completion of the present invention.

SUMMARY OF THE INVENTION

Accordingly, an object of the present invention is to provide an adhesive composition comprising (1) a carboxyl group-containing adhesive component having a weight average molecular weight of 800,000 or greater and (2) an amino group-containing adhesion-improving component having a weight average molecular weight of 100,000 or less, the adhesive composition being prepared by adding 1–40 parts by weight of the adhesion-improving component (2) to 100 parts by weight of the adhesive component (1) to crosslink the adhesive component (1).

Other and further objects, features and advantages of the present invention will appear more fully from the following description.

DETAILED DESCRIPTION OF THE INVENTION AND THE PREFERRED EMBODIMENTS

As an example of the adhesive component (1) containing a carboxyl group and having a weight average molecular weight of 800,000 or greater (hereinafter referred to as the "carboxyl group-containing resinous composition (1)", for simplicity) employed in this invention, a resinous composition having a weight average molecular weight of 800,000 or greater prepared by copolymerization of a major proportion of a $C_{1-12}$ alkyl (meth)acrylate and 0.5–10% by weight of a carboxyl group-containing unsaturated monomer which is copolymerizable with the alkyl (meth)acrylate, can be given. Such a resinous composition can be manufactured by polymerizing (a) and (b) described below:

(a) A $C_{1-12}$ alkyl (meth)acrylate: 90–99.5% by weight (b) A carboxyl group-containing unsaturated monomer which is copolymerizable with (a): 0.5–10% by weight Of the above, the component (a) is required to provide the product with the basic adhesiveness. Further, the component (b) is required to introduce the carboxyl group into the adhesive composition. Examples of the component (b) include acrylic acid, methacrylic acid, maleic acid, crotonic acid, β-carboxyethyl acrylate, and the like. If necessary, in addition to the components (a) and (b), 0.5–10% by weight of another unsaturated monomer that is copolymerizable with the alkyl (meth)acrylate (a) may be added.

Meanwhile, as an example of the adhesion-improving component (2) containing amino group and having a weight average molecular weight of 100,000 or less (hereinafter referred to as the "amino group-containing resinous composition (2)"), a resinous composition having a weight average molecular weight of 100,000 or less, prepared by copolymerization of a major proportion of a $C_{1-20}$ alkyl methacrylate or a $C_{3-20}$ cycloalkyl methacrylate having a glass transition temperature (hereinafter referred to as "Tg") of 40° C. or higher and 0.5–10% by weight of an amino group-containing unsaturated monomer which is copolymerizable with the alkyl methacrylate or cycloalkyl methacrylate can be mentioned. This product can be prepared by polymerizing (c) and (d) described below:

(c) A $C_{1-20}$ alkyl methacrylate or a $C_{3-20}$ cycloalkyl methacrylate having a Tg of 40° C. or higher: 90–99.5% by weight (d) An amino group-containing unsaturated monomer copolymerizable with (c): 0.5–10% by weight Of the above, the component (c) is required to improve the adhesion to plastics. Further, as the component (d), amino group-containing compounds such as aminoethyl (meth)acrylate, dimethylaminoethyl (meth)acrylate, dimethylaminopropyl (meth)acrylate, or vinylpyridine can be mentioned.

Each of the above carboxyl group-containing resinous composition (1) and amino group-containing resinous composition (2) may be produced preferably through radical polymerization, using an organic peroxide such as benzoyl peroxide or lauryl peroxide and an azo-compound polymerization initiator such as azo(bis)isobutylonitrile, respectively, for which a solution polymerization technique in particular is desirable.

To obtain an adhesive composition related to the present invention, it is essential to blend the carboxyl group-containing resinous composition (1) and the amino group-containing resinous composition (2) mentioned above, and then to crosslink them. While the required blending ratio generally is 1–40 parts by weight of the amino group-containing resinous composition (2) to 100 parts by weight of the Carboxyl group-containing resinous composition (1), for applications requiring the best possible compatibility and transparency, it is preferred to use a blending ratio of 1–20 parts by weight for the amino group-containing resinous composition (2).

The crosslinking reaction, on the other hand, is provided for improving the adhesive performance and the anti-blistering performance of the product.

Such crosslinking reactions, specifically, can be performed by utilizing a polyisocyanate crosslinking, an epoxy crosslinking, a metal chelate crosslinking, or an amino resin crosslinking, among which the epoxy crosslinking is particularly effective. As the crosslinking agent for these crosslinking reactions, poly-functional isocyanate compounds such as tolylene diisocyanate and hexamethylene diisocyanate; poly-functional epoxy compounds such as ethylene glycol diglycidyl ether, propylene glycol diglycidyl ether, and tetraglycidyl xylenediamine; chelate compounds of Al, Ni, or Zn, etc.; and melamine compounds can be mentioned.

The adhesive composition of the present invention thus obtained as described in the above possesses excellent adhesive characteristics, compatibility, transparency and anti-blistering characteristics to plastics under normal as well as high temperatures, and therefore provides an excellent adhesive for plastics.

Accordingly, in addition to the ordinary use as an adhesive agent for plastics, the composition can be applied to a transparent sheet or a transparent tape, for instance, to manufacture plastic adhesive films or transparent protective films for plastics such as transparent adhesive sheets, transparent plastic protective sheets, transparent adhesive tapes, double-coated adhesive tapes, or transparent labels.

In particular, when the plastic adhesive film using an adhesive composition of the present invention as described above is applied to the surface of a plastic resin such as polycarbonate resin, acrylic resin, or styrene resin, advantages are obtained inasmuch as the application is able to provide effective protection to the surface of the plastic resin, while preventing foaming and/or blistering.

The excellent adhesive performance, compatibility, transparency, anti-blistering performance, and the like demonstrated by the adhesive composition of the present invention can be explained as an effect resulting from an interaction created between the carboxyl group of the carboxyl group-containing resinous composition (1) and the amino group of the amino group-containing resinous composition (2). In other words, it can be understood that an ionic attraction generated between the carboxyl group and the amino group is forcing these polymers to associate to improve their compatibility, and that the interaction at the same time increases the intermolecular force to enhance the cohesive force.

The second function of the invention comes from the crosslinking of the carboxyl group-containing resinous composition (1) and the amino group-containing resinous composition (2). In other words, as an effect of the crosslinking, any gas from the adhesive composition, if generated, can be contained in the material and prevented from creating bubbles, which results in its excellent anti-blistering performance.

In the following descriptions, a more detailed explanation of this invention will be presented based on numerous examples. However, the present invention is not in any way restricted whatsoever to those described in the examples. Note also that the proportional units used in the examples are according to weight, and that the weight average molecular weight is measured by means of gel permeation chromatography (GPC).

EXAMPLES

Preparation Example 1

To a chemical reactor equipped with a stirrer, a reflux condenser, a thermometer and a nitrogen charge pipe, 95 parts of butyl acrylate, 5 parts of acrylic acid, and 150 parts of ethyl acetate were added and, with the addition of 0.2 part of azo(bis)isonitrile and under a flow of nitrogen gas, the mixture was allowed to polymerize at 68° C. for 8 hours. Upon completion of the reaction, the product was diluted with ethyl acetate and adjusted to a 20% solid content to obtain a polymer solution having a viscosity of 7,200 cp and a weight average molecular weight of 1,050,000.

Preparation Example 2

To the same chemical reactor as in Preparation Example 1, 95 parts of butyl acrylate, 5 parts of acrylic acid, and 180 parts of ethyl acetate were added and, with the addition of 0.4 part of azo(bis)isonitrile and under a flow of nitrogen gas, the mixture was allowed to polymerize at 70° C. for 8 hours. After the reaction was completed the product was diluted with ethyl acetate and adjusted to a 25% solid content to obtain a polymer solution having a viscosity of 6,000 cp and a weight average molecular weight of 600,000.

Preparation Example 3

To the same chemical reactor as in Preparation Example 1, 100 parts of toluene was added and, under a flow of nitrogen gas, heated to 90° C. To this, 99 parts of methyl methacrylate (Tg at 105° C.), 1 part of dimethylaminoethyl methacrylate, and 1 part azo (bis) isonitrile were added dropwise from a dropping funnel over a period of 2 hours; then with an additional 1 part azo(bis)isonitrile and with reflux, the mixture was allowed to polymerize for 5 hours. Upon completion of the reaction the product was diluted with toluene and adjusted to a 45% solid content to obtain a polymer solution having a viscosity of 98 cp and a weight average molecular weight of 20,000.

Preparation Example 4

Except for changing the quantity of methyl methacrylate to 97 parts, and that of dimethylaminoethyl methacrylate to 3 parts, the same equipment and conditions as in Preparation Example 3 were used, and a polymer solution of a 45% solid content having a viscosity of 95 cp and a weight average molecular weight of 20,000 was obtained.

Preparation Example 5

Except for changing the quantity of methyl methacrylate to 95 parts, and that of dimethylaminoethyl methacrylate to 5 parts, the same equipment and conditions as in Preparation Example 3 were used, and a polymer solution of a 45% solid content having a viscosity of 90 cp and a weight average molecular weight of 20,000 was obtained.

Preparation Example 6

Except for the monomer which was 100 parts methyl methacrylate, the same equipment and conditions as in Preparation Example 3, a polymer solution of a 45% solid content having a viscosity of 100 cp and a weight average molecular weight of 20,000 was obtained.

Preparation Example 7

In a manner similar to Preparation Example 3, 60 parts of toluene was added to the same chemical reactor as in Preparation Example 1, and heated to 90° C. under a flow of nitrogen gas. To this, 95 parts of methyl methacrylate, 5 parts of dimethylaminoethyl methacrylate, and 0.5 part azo(bis)isonitrile were added dropwise over a period of 2 hours with the remaining procedures carried out as in Preparation Example 3. A polymer solution of a 45% solid content, having a viscosity of 960 cp and a weight average molecular weight of 150,000 was obtained.

Preparation Example 8

In a manner similar to Preparation Example 3, 60 parts of toluene was added to the same chemical reactor as in Preparation Example 1, and heated to 90° C. under a flow of nitrogen gas. To this, 95 parts of cyclohexyl methacrylate (Tg at 56° C.), 5 parts of dimethylaminoethyl methacrylate, and 0.5 part of azo(bis)isonitrile were added dropwise over a period of 2 hours; with the remaining procedures carried out as in Preparation Example 3. A polymer solution of a 45% solid content having a viscosity of 80 cp and a weight average molecular weight of 20,000 was obtained.

Preparation Example 9

In a manner similar to Preparation Example 3, 60 parts of toluene was charged into the same chemical reactor as in Preparation Example 1, and heated to 90° C. under a flow of nitrogen gas. To this, 95 parts of 2-ethylhexyl methacrylate (Tg at –10° C.), 5 parts of dimethylaminoethyl methacrylate, and 0.5 part of azo(bis)isonitrile were added dropwise over a period of 2 hours with the remaining procedures carried out as in Preparation Example 3. A polymer solution of 45% solid content, having a viscosity of 85 cp and a weight average molecular weight of 20,000 was obtained.

Preparation Example 10

To the same chemical reactor as in Preparation Example 1, 130 parts of toluene was added and heated to 90° C. under a flow of nitrogen gas. To this, 99.5 parts of n-butyl methacrylate (Tg at 20° C.) and 0.5 part of methacrylic acid were added dropwise from a dropping funnel over a period of 2 hours. Then with an addition of 1 part of azo(bis) isonitrile, the mixture was allowed to polymerize for 5 hours with reflux. Upon completion of the reaction the product was diluted with toluene and adjusted to 40% solid content to obtain a polymer solution having a viscosity of 40 cp and a weight average molecular weight of 15,000 (or number average molecular weight of 7,400).

Preparation Example 11

Except for a change in the quantity of toluene to 120 parts, and the use of isobutyl methacrylate (Tg at 48° C.) in place of n-butyl methacrylate, using the same equipment and conditions as in Preparation Example 10, a polymer solution of 40% solid content, having a viscosity of 55 cp and a weight average molecular weight of 16,000 (or number average molecular weight of 8,500) was obtained.

Preparation Example 12

To the same chemical reactor as in Preparation Example 1, 140 parts of toluene was added and heated to 90° C. under a flow of nitrogen gas. To this, 49.8 parts of n-butyl methacrylate, 49.8 parts of isobornyl methacrylate (Tg at 155° C.), 0.5 part of methacrylic acid, and 1 part of azo(bis) isonitrile were added dropwise from a dropping funnel over a period of 2 hours. An additional 1 part of azo(bis)isonitrile was added and the mixture was allowed to polymerize for 5 hours with reflux. Upon completion of the reaction the product was diluted with toluene and adjusted to 40% solid content to obtain a polymer solution having a viscosity of 20 cp and a weight average molecular weight of 9,000 (or number average molecular weight of 3,000).

Preparation Example 13

To the same chemical reactor as in Preparation Example 1, 150 parts of toluene was added and heated to 90° C. under a flow of nitrogen gas. To this, 95 parts of n-butyl methacrylate, 5 parts of dimethylaminoethyl methacrylate, and 1 part azo(bis)isonitrile were added dropwise from a dropping funnel over a period of 2 hours. An additional 1 part of azo(bis)isonitrile was then added and the mixture was allowed to polymerize for 5 hours with reflux. Upon completion of the reaction the product was diluted with toluene and adjusted to 40% solid content to obtain a polymer solution having a viscosity of 18 cp and a weight average molecular weight of 8,500 (or number average molecular weight of 3,000).

Preparation Example 14

Except that isobutyl methacrylate was used in place of n-butyl methacrylate, using the same equipment and conditions as in Preparation Example 13, a polymer solution of 40% solid content, having a viscosity of 15 cp and a weight average molecular weight of 8,500 (or number average molecular weight of 3,000) was obtained.

Preparation Example 15

To the same chemical reactor as in Preparation Example 1, 140 parts of toluene was added and heated to 90° C. under a flow of nitrogen gas. To this, 49.8 parts of n-butyl methacrylate, 49.8 parts of isobornyl methacrylate, 0.5 part of dimethylaminoethyl methacrylate, and 1 part of azo(bis) isonitrile were added dropwise from a dropping funnel over a period of 2 hours. An additional 1 part of azo (bis) isonitrile was then added and the mixture was allowed to polymerize for 5 hours with reflux. Upon completion of the reaction the product was diluted with toluene and adjusted to 40% solid content to obtain a polymer solution having a viscosity of 25 cp and a weight average molecular weight of 9,000 (or number average molecular weight of 3,000).

Example 1

An adhesive film was prepared by adding 10 parts of the polymer obtained in Preparation Example 3 to 100 parts of the polymer obtained in Preparation Example 1, and further adding 0.05 part of an epoxy resin, Tetrad C, as a crosslinking agent, coating the mixture onto an aluminum vapor-deposited polyester film having a thickness of 25 $\mu$m so that the adhesive layer had a thickness of 25 $\mu$m after drying, and subsequently, after heat drying, covering the adhesive layer with a silicone-coated, 38-$\mu$m polyester film separator.

Example 2

An adhesive film was prepared in the same manner as in Example 1, except 10 parts of the polymer obtained in Preparation Example 4 was added to 100 parts of the polymer obtained in Preparation Example 1.

Example 3

An adhesive film was prepared in the same manner as in Example 1, except that 10 parts of the polymer obtained in Preparation Example 5 was added to 100 parts of the polymer obtained in Preparation Example 1.

Example 4

An adhesive film was prepared in the same manner as in Example 1, except that 3 parts of the polymer obtained in Preparation Example 5 was added to 100 parts of the polymer obtained in Preparation Example 1.

Example 5

An adhesive film was prepared in the same manner as in Example 1, except that 25 parts of the polymer obtained in Preparation Example 5 was added to 100 parts of the polymer obtained in Preparation Example 1.

Example 6

An adhesive film was prepared in the same manner as in Example 1, except that 3 parts of the polymer obtained in Preparation Example 8 was added to 100 parts of the polymer obtained in Preparation Example 1.

Example 7

An adhesive film was prepared in the same manner as in Example 1, except that 10 parts of the polymer obtained in Preparation Example 8 was added to 100 parts of the polymer obtained in Preparation Example 1.

Example 8

An adhesive film was prepared in the same manner as in Example 1, except that 40 parts of the polymer obtained in Preparation Example 5 was added to 100 parts of the polymer obtained in Preparation Example 1.

Example 9

An adhesive film was prepared in the same manner as in Example 1, except that 10 parts of the polymer obtained in Preparation Example 13 was added to 100 parts of the polymer obtained in Preparation Example 1.

Example 10

An adhesive film was prepared in the same manner as in Example 1, except that 10 parts of the polymer obtained in Preparation Example 14 was added to 100 parts of the polymer obtained in Preparation Example 1.

Example 11

An adhesive film was prepared in the same manner as in Example 1, except that 10 parts of the polymer obtained in Preparation Example 15 was added to 100 parts of the polymer obtained in Preparation Example 1.

Comparative Example 1

An adhesive film was prepared in the same manner as in Example 1, except that only the polymer obtained in Preparation Example 1 was used.

Comparative Example 2

An adhesive film was prepared in the same manner as in Example 1, except that 10 parts of the polymer obtained in Preparation Example 6 was added to 100 parts of the polymer obtained in Preparation Example 1.

Comparative Example 3

An adhesive film was prepared in the same manner as in Example 1, except that 10 parts of the polymer obtained in Preparation Example 5 was added to 100 parts of the polymer obtained in Preparation Example 2.

Comparative Example 4

An adhesive film was prepared in the same manner as in Example 1, except that 10 parts of the polymer obtained in Preparation Example 7 was added to 100 parts of the polymer obtained in Preparation Example 1.

Comparative Example 5

An adhesive film was prepared in the same manner as in Example 1, except that 50 parts of the polymer obtained in Preparation Example 5 was added to 100 parts of the polymer obtained in Preparation Example 1.

Comparative Example 6

An adhesive film was prepared in the same manner as in Example 1, except that 10 parts of the polymer obtained in Preparation Example 9 was added to 100 parts of the polymer obtained in Preparation Example 1.

Comparative Example 7

An adhesive film was prepared by adding 10 parts of the polymer obtained in Preparation Example 5 to 100 parts of the polymer obtained in Preparation Example 1, coating the mixture onto an aluminum vapor-deposited polyester film having a thickness of 25 $\mu$m so that the adhesive layer had a thickness of 25 $\mu$m after drying, and subsequently after heat drying, covering the adhesive layer with a silicone-coated, 38-$\mu$m polyester film separator.

Comparative Example 8

An adhesive film was prepared in the same manner as in Comparative Example 7, except that 10 parts of the polymer obtained in Preparation Example 10 was added to 100 parts of the polymer obtained in Preparation Example 1.

Comparative Example 9

An adhesive film was prepared in the same manner as in Example 1, except that 10 parts of the polymer obtained in Preparation Example 10 was added to 100 parts of the polymer obtained in Preparation Example 1.

Comparative Example 10

An adhesive film was prepared in the same manner as in Comparative Example 7, except that 10 parts of the polymer obtained in Preparation Example 11 was added to 100 parts of the polymer obtained in Preparation Example 1.

Comparative Example 11

An adhesive film was prepared in the same manner as in Example 1, except that 10 parts of the polymer obtained in Preparation Example 11 was added to 100 parts of the polymer obtained in Preparation Example 1.

Comparative Example 12

An adhesive film was prepared in the same manner as in Comparative Example 7, except that 10 parts of the polymer obtained in Preparation Example 12 was added to 100 parts of the polymer obtained in Preparation Example 1.

Comparative Example 13

An adhesive film was prepared in the same manner as in Example 1, except that 10 parts of the polymer obtained in Preparation Example 12 was added to 100 parts of the polymer obtained in Preparation Example 1.

Comparative Example 14

An adhesive film was prepared in the same manner as in Comparative Example 7, except that 10 parts of the polymer obtained in Preparation Example 13 was added to 100 parts of the polymer obtained in Preparation Example 1.

Comparative Example 15

An adhesive film was prepared in the same manner as in Comparative Example 7, except that 10 parts of the polymer obtained in Preparation Example 14 was added to 100 parts of the polymer obtained in Preparation Example 1.

Comparative Example 16

An adhesive film was prepared in the same manner as in Comparative Example 7, except that 10 parts of the polymer obtained in Preparation Example 15 was added to 100 parts of the polymer obtained in Preparation Example 1.

Test Example 1
<Adhesion Test>

The adhesive strengths of various adhesive films prepared in Examples 1 through 11 and Comparative Examples 1 through 16 were tested using a 180° peel adhesion measurement and a constant-load peel adhesion measurement.

The 180° peel adhesion measurement was conducted in accordance with JIS Z 0237, paragraph 8, except width of the adhesive film was 20 mm and the test panel used was made of polycarbonate, and the peeling force was measured at a peeling speed of 300 mm/min, and at 20 minutes as well as 24 hours after application of a test film onto a test panel. The constant-load peel adhesion measurement was conducted on test films with dimensions of 20 by 50 mm, where the degree of dislocation caused by a load of 300 grams applied for 60 minutes was measured. The test results are summarized in Table 1 below:

<Results>

TABLE 1

| Specimen | 180° peel adhesion measurement | | Constant-load peel adhesion |
|---|---|---|---|
| | 20 minutes | 24 minutes | measurement (mm) |
| Example 1 | 950 | 1200 | 2.0 |
| Example 2 | 1000 | 1280 | 0.5 |
| Example 3 | 1000 | 1300 | No dislocation |
| Example 4 | 900 | 1100 | 3.5 |
| Example 5 | 1150 | 1380 | No dislocation |
| Example 6 | 900 | 1060 | 4.0 |
| Example 7 | 1030 | 1340 | No dislocation |
| Example 8 | 1400 | 1500 | No dislocation |
| Example 9 | 1000 | 1260 | 6.0 |
| Example 10 | 1050 | 1300 | 4.5 |
| Example 11 | 1120 | 1370 | 5.0 |
| Comp. Example 1 | 700 | 750 | 20.0 |
| Comp. Example 2 | 800 | 1000 | 5.0 |
| Comp. Example 3 | 1050 | 1300 | 10.5 |
| Comp. Example 4 | 1000 | 1200 | 5.5 |
| Comp. Example 5 | 1350 | 1500 | No dislocation |
| Comp. Example 6 | 820 | 950 | 12.5 |
| Comp. Example 7 | 2500 | 3000< | Fell after 2 min. |
| Comp. Example 8 | 2250 | 3000< | Fell after 2 min. |
| Comp. Example 9 | 900 | 1070 | 12.5 |
| Comp. Example 10 | 2270 | 3000< | Fell after 2 min. |
| Comp. Example 11 | 980 | 1150 | 10.5 |
| Comp. Example 12 | 2500 | 3000< | Fell after 2 min. |
| Comp. Example 13 | 1000 | 1280 | 10.5 |
| Comp. Example 14 | 2380 | 3000< | Fell after 2 min. |
| Comp. Example 15 | 2390 | 3000< | Fell after 2 min. |
| Comp. Example 16 | 2350 | 3000< | Fell after 2 min. |

Test Example 2
<Adhesion Test>

Adhesive films prepared in Examples 1 through 11 and Comparative Examples 1 through 16 were tested for shear adhesion (holding power), anti-blistering performance, and transparency.

The shear adhesion measurement was conducted based on procedures provided in JIS Z 0237, paragraph 11, with a test adhesive film having a width of 20 mm being applied onto a stainless steel panel to provide an adhesion face area of 20 by 20 mm, to which a load of 1 kg was applied at 40° C., and the resulting dislocation was measured. To evaluate the anti-blistering performance, a test adhesive film with dimensions of 50 by 50 mm was applied to a polycarbonate panel, left for a day and then subjected to a temperature of 80° C. for an hour; after which its appearance was inspected for blisters by visual inspection and rated according to the criteria given below. For the transparency evaluation, a test adhesive film was applied to a polycarbonate panel, where the degree of darkening was visually inspected and rated according to the criteria given below.

<Rating Criteria for Anti-blistering Performance>
Rating Condition of Adhesion Face ⊚ No blistering, with 0–20 bubbles recognizable in specimen ○ No blistering, with 21–50 bubbles recognizable in specimen Δ No blistering, with 51–100 bubbles recognizable in specimen × Blistering apparent, or more than 101 bubbles recognizable in specimen <Rating Criteria for Transparency>
Rating Condition of Adhesion Face ⊚ Completely transparent ○ Slight darkening recognized Δ Moderate darkening recognized × Severe darkening <Results>

TABLE 2

| Specimen | Sheer adhesion measurement | Anti-blistering performance | Transparency |
|---|---|---|---|
| Example 1 | No dislocation | ○ | ○ |
| Example 2 | No dislocation | ◎ | ◎ |
| Example 3 | No dislocation | ◎ | ◎ |
| Example 4 | No dislocation | ○ | ◎ |
| Example 5 | No dislocation | ◎ | ○ |
| Example 6 | No dislocation | ○ | ◎ |
| Example 7 | No dislocation | ◎ | ◎ |
| Example 8 | No dislocation | ◎ | △ |
| Example 9 | No dislocation | △ | ◎ |
| Example 10 | No dislocation | ○ | ◎ |
| Example 11 | No dislocation | ○ | ◎ |
| Comp. Example 1 | No dislocation | X | ◎ |
| Comp. Example 2 | No dislocation | X | X |
| Comp. Example 3 | No dislocation | X | ◎ |
| Comp. Example 4 | No dislocation | △ | X |
| Comp. Example 5 | No dislocation | ◎ | X |
| Comp. Example 6 | No dislocation | X | ○ |
| Comp. Example 7 | Fell after 10 min. | X | ◎ |
| Comp. Example 8 | Fell after 5 min. | X | ○ |
| Comp. Example 9 | No dislocation | X | ○ |
| Comp. Example 10 | Fell after 10 min. | X | ○ |
| Comp. Example 11 | No dislocation | X | ○ |
| Comp. Example 12 | Fell after 9 min. | X | X |
| Comp. Example 13 | No dislocation | X | X |
| Comp. Example 14 | Fell after 8 min. | X | ◎ |
| Comp. Example 15 | Fell after 12 min. | X | ◎ |
| Comp. Example 16 | Fell after 12 min. | X | ◎ |

EFFECT OF THE INVENTION

The adhesive composition of the present invention possesses excellent compatibility, transparency, and adhesive characteristics for plastics under normal and high temperatures. Moreover, products such as plastic adhesive tapes or plastic adhesive sheet obtained by applying the composition to films or sheet are capable of controlling blistering.

Accordingly, the adhesive composition of the present invention can be advantageously used as an adhesive agent for applications for plastic adhesive films such as plastic adhesive sheets, plastic protective sheets, adhesive tapes, double-coated adhesive tapes, adhesive labels, or protective films for plastics, as well as for ordinary adhesive agent for plastics.

Obviously, numerous modifications and variations of the present invention are possible in light of the above teachings. It is therefore to be understood that within the scope of the appended claims, the invention may be practiced otherwise than as specifically described herein.

What is claimed is:

1. An adhesive composition consisting essentially of solution of (1) a carboxyl group-containing adhesive component having a weight average molecular weight of 800,000 or greater and (2) an amino group-containing adhesion-improving component having a weight average molecular weight of 100,000 or less, the adhesive composition being prepared by adding 1–40 parts by weight of the adhesion-improving component (2) to 100 parts by weight of adhesive component (1) crosslink adhesive component (1).

2. The adhesive composition according to claim 1, wherein the adhesive component (1) is prepared by copolymerization of a major proportion of a $C_{1-12}$ alkyl (meth) acrylate and 0.5–10% by weight of a carboxyl group-containing unsaturated monomer which is copolymerizable with the alkyl (meth)acrylate.

3. The adhesive composition according to claim 1, wherein the adhesion-improving component (2) is prepared by copolymerization of a major proportion of a $C_{1-20}$ alkyl methacrylate or a $C_{3-20}$ cycloalkyl methacrylate the copolymer of which has a glass transition temperature of 40° C. or higher and 0.5–10% by weight of an amino group-containing unsaturated monomer which is copolymerizable with the alkyl methacrylate or cycloalkyl methacrylate.

4. The adhesive composition according to claim 1, wherein the amino group contained in the adhesion-improving component (2) is a tertiary amine.

* * * * *